United States Patent [19]

Tsunoda

[11] Patent Number: 5,287,099
[45] Date of Patent: Feb. 15, 1994

[54] MULTI-ALERT RADIO PAGING SYSTEM

[75] Inventor: Kazuyuki Tsunoda, Tokyo, Japan

[73] Assignee: NEC Corporation, Tokyo, Japan

[21] Appl. No.: 807,401

[22] Filed: Dec. 12, 1991

Related U.S. Application Data

[63] Continuation of Ser. No. 414,173, Sep. 15, 1989, abandoned, which is a continuation-in-part of Ser. No. 097,022, Sep. 16, 1987, abandoned.

[30] Foreign Application Priority Data

Sep. 16, 1986 [JP] Japan ................................ 61-217625

[51] Int. Cl.[5] .................................................. G08B 5/22
[52] U.S. Cl. ......................... 340/825.440; 340/825.480
[58] Field of Search ........................ 340/825.44, 825.47, 340/825.48, 825.04; 84/2, 648, 655

[56] References Cited

U.S. PATENT DOCUMENTS

| | | | |
|---|---|---|---|
| 4,145,684 | 3/1979 | Stodolski | 340/825.48 |
| 4,181,893 | 1/1980 | Ehmke | 340/825.48 |
| 4,403,212 | 9/1983 | Masaki | 340/825.48 |
| 4,431,990 | 2/1984 | Wycoff et al. | 340/825.44 |
| 4,449,040 | 5/1984 | Matsuoka et al. | 340/825.32 |
| 4,462,030 | 7/1984 | Ishii | 340/825.44 |
| 4,537,108 | 8/1985 | Shiramizu | 84/648 |
| 4,563,680 | 1/1986 | Nakajima | 340/825.44 |
| 4,704,608 | 11/1987 | Sato et al. | 340/824.44 |
| 4,818,987 | 4/0489 | Ide et al. | 340/825.48 |

FOREIGN PATENT DOCUMENTS

| | | |
|---|---|---|
| 4994 | 10/1984 | Rep. of Korea . |
| 1043 | 7/1986 | Rep. of Korea . |
| 4652 | 6/1988 | Rep. of Korea . |

*Primary Examiner*—Donald J. Yusko
*Assistant Examiner*—Edwin C. Holloway, III
*Attorney, Agent, or Firm*—Sughrue, Mion, Zinn, Macpeak & Seas

[57] ABSTRACT

A multi-alert paging receiver of this invention includes a decoder. The decoder constitutes ON durations of alert signals corresponding to the plurality of addresses by using combinations of at least two tones having different frequencies including a specific frequency.

8 Claims, 9 Drawing Sheets

FIG.2

FIG.3 (a) ALERT SIGNAL A'

FIG.3 (b) ALERT SIGNAL B'

FIG.3 (c) ALERT SIGNAL C'

FIG.3 (d) ALERT SIGNAL D'

FIG.3 (e) ALERT SIGNAL E'

FIG.3 (f) FREQUENCY

FIG.3 (g) TONE

MULTI-ALERT RADIO PAGING SYSTEM

This is a Continuation of Application No. 07/414,173 filed Sep. 15, 1989 (now abandoned), which is a Continuation-In-Part Application of Application No. 07/097,022 filed Sep. 16, 1987 (now abandoned).

BACKGROUND OF THE INVENTION

The present invention relates to a multi-alert radio paging receiver.

An alert means in a conventional radio paging receiver utilizes beeping, flickering of LEDs, or vibration. Along with multifunctions of the radio paging receiver, a multi-address radio paging receiver is proposed. For example, the POCSAG code internationally standardized as the Radio Paging Code No. 1 (RPCl) by the CCIR allows a radio paging receiver to have four paging addresses. Conventionally, for example, when beep or alert signals A, B, C, D, and E correspond to paging addresses, the alert signals A to E are distinguished from each other by changing an ON/OFF duration of a tone having a single frequency $f_1$, as shown in FIGS. 1(a) to 1(f). When the multi-address radio paging receiver adopts the above method wherein the ON/OFF duration of the tone having a single frequency is changed, the alert signals are complicated, and cannot be easily distinguished from each other.

However, if additional call signals are to be generated by utilizing a tone having another frequency, a difference between the frequencies must be increased to easily distinguish the call signals from each other. A loudspeaker used for the conventional radio paging receiver is usually designed to resonate at a single frequency in order to realize a compact structure and high sound pressure. Therefore, sound pressure is noticeably decreased with respect to the other frequency.

SUMMARY OF THE INVENTION

It is an object of the present invention to provide a simple multi-alert paging receiver which is free from the conventional drawbacks and can increase the number of addresses without decreasing sound pressure even if a plurality of frequencies are used.

The multi-alert paging receiver according to the present invention comprises decoder means which constitutes ON durations of alert signals corresponding to the plurality of addresses by using combinations of at least two tones having different frequencies including a specific frequency.

BRIEF DESCRIPTION OF THE DRAWINGS

FIGS. 6(A) to 6(J) are timing charts showing signal waveforms of the respective sections in one alert mode;

FIGS. 7(D) to 7(J) are timing charts showing signal waveforms of the respective sections in FIG. 4 in another alert mode.

DETAILED DESCRIPTION OF THE PREFERRED EMBODIMENT

A radio paging receiver according to the present invention will now be described with reference to the accompanying drawings.

Figure 1A:
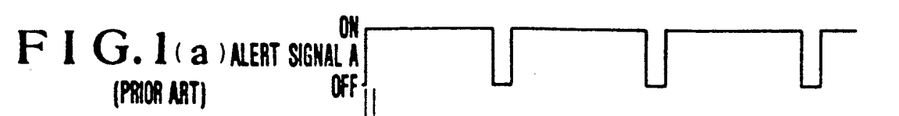
FIGS. 1(a) to 1(f) are timing charts showing conventional alert signals.
Figure 1B:
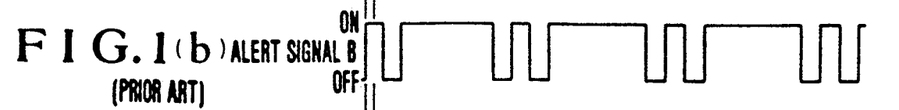
Figure 1C:
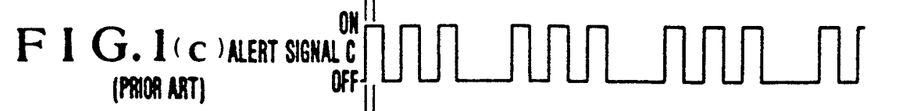
Figure 1D:
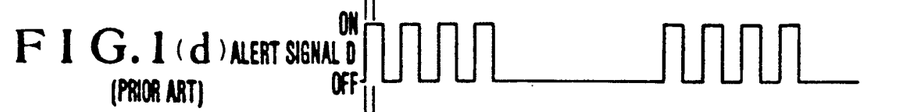
Figure 1E:
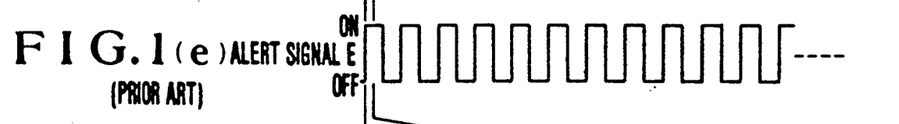
Figure 1F:
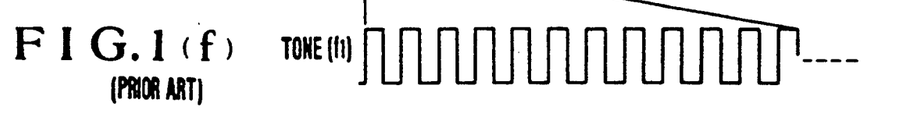
Figure 2:
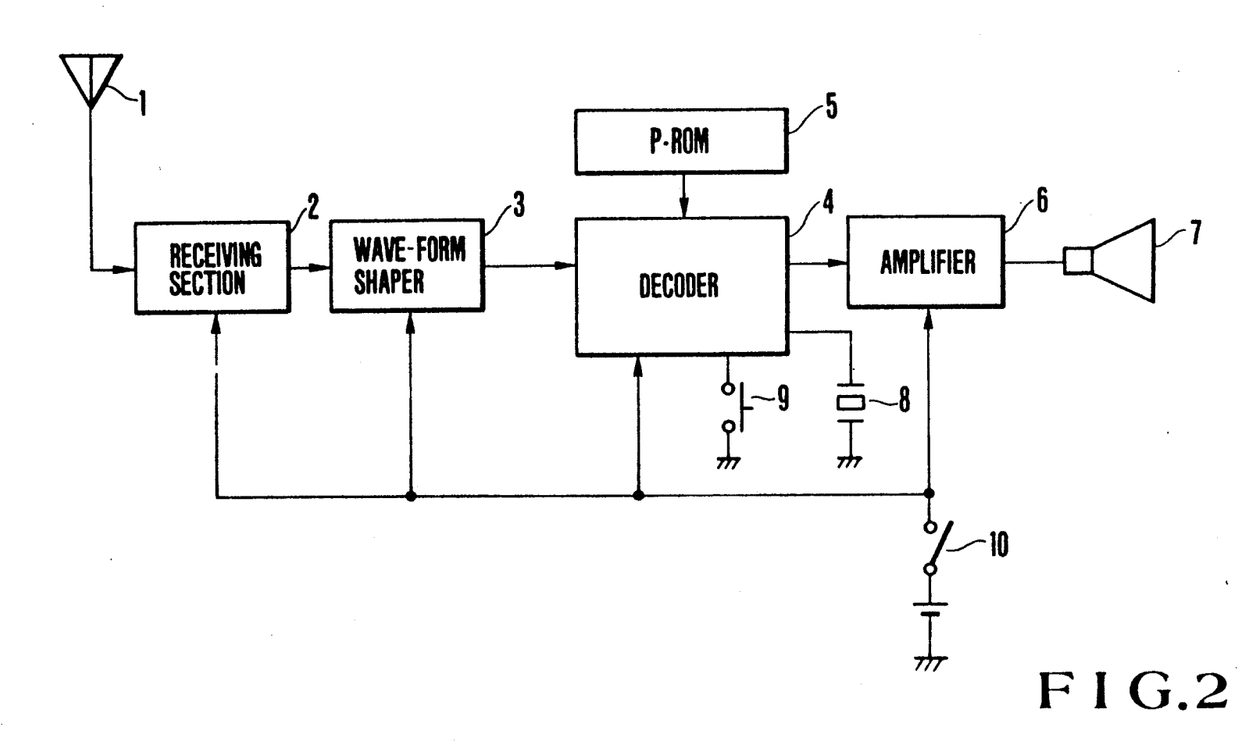
FIGS. 2 is a block diagram showing an arrangement of a radio paging receiver to which the present invention is applied.
Figure 3A:
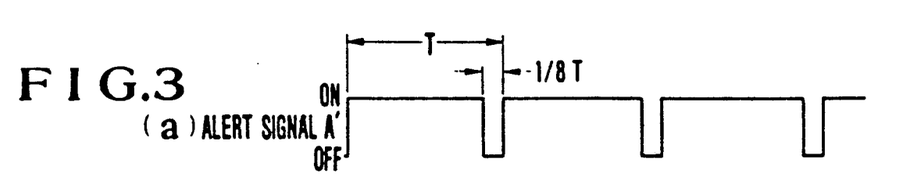
FIGS. 3(a) to 3(g) are timing charts showing alert signals according to the present invention.
Figure 3B:
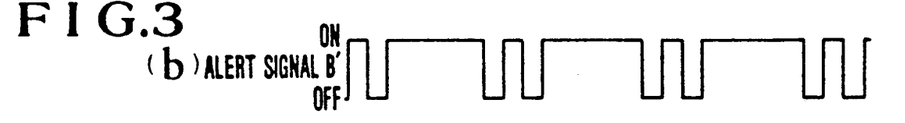
Figure 3C:
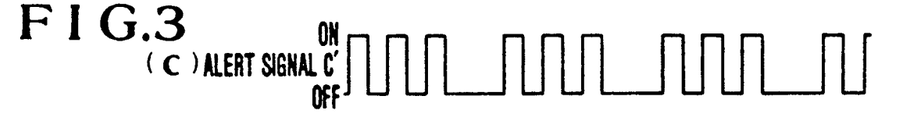
Figure 3D:
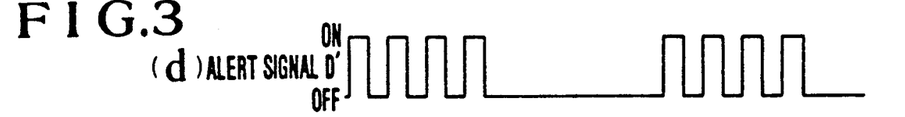
Figure 3E:
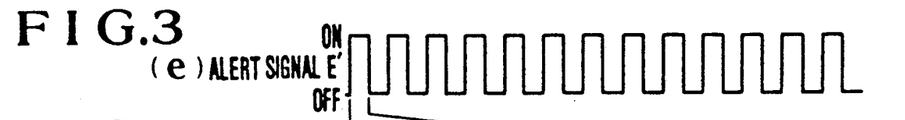
Figure 3F:
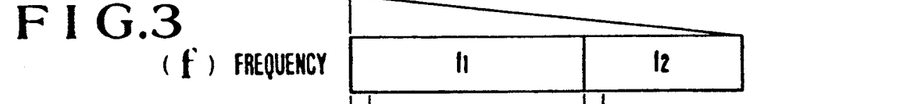
Figure 3G:
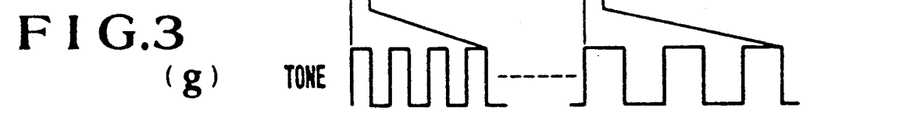

FIG. 2 is a block diagram of a radio paging receiver to which the present invention is applied. Referring to FIG. 2, a radio signal received by an antenna 1 is amplified and demodulated by a receiving section 2. The demodulated signal is converted by a waveform shaper 3 into a signal having a waveform that can be read by a decoder 4. In the decoder 4, a paging address prestored in a programmable read-only memory (P-ROM) 5 is compared with the signal from the waveform shaper 3. When a coincidence is established therebetween, the decoder 4 supplies, to an amplifier 6, an alert signal corresponding to the paging address to drive a loudspeaker 7, thereby informing the pager bearer of being paged. A reset switch 9 is connected to the decoder 4 to stop the alert signal. A quartz oscillator 8 generates a clock for driving the decoder 4.

FIG. 3 shows a plurality of types of alert signals generated by a paging receiver according to an embodiment of the present invention. The ON/OFF durations of alert signals A' to E' shown in FIG. 3 are the same as those of the alert signals A to E shown in FIG. 1. In this embodiment, however, the shortest duration (e.g., ⅛ a period T in the alert signal A') of the ON/OFF durations of the alert signals corresponds to a frequency $f_1$ of the tone or two different frequencies $f_1$ and $f_2$. The frequency $f_1$ coincides with the tone frequency in FIG. 1(f) at which the loudspeaker 7 resonates.

Figure 4:
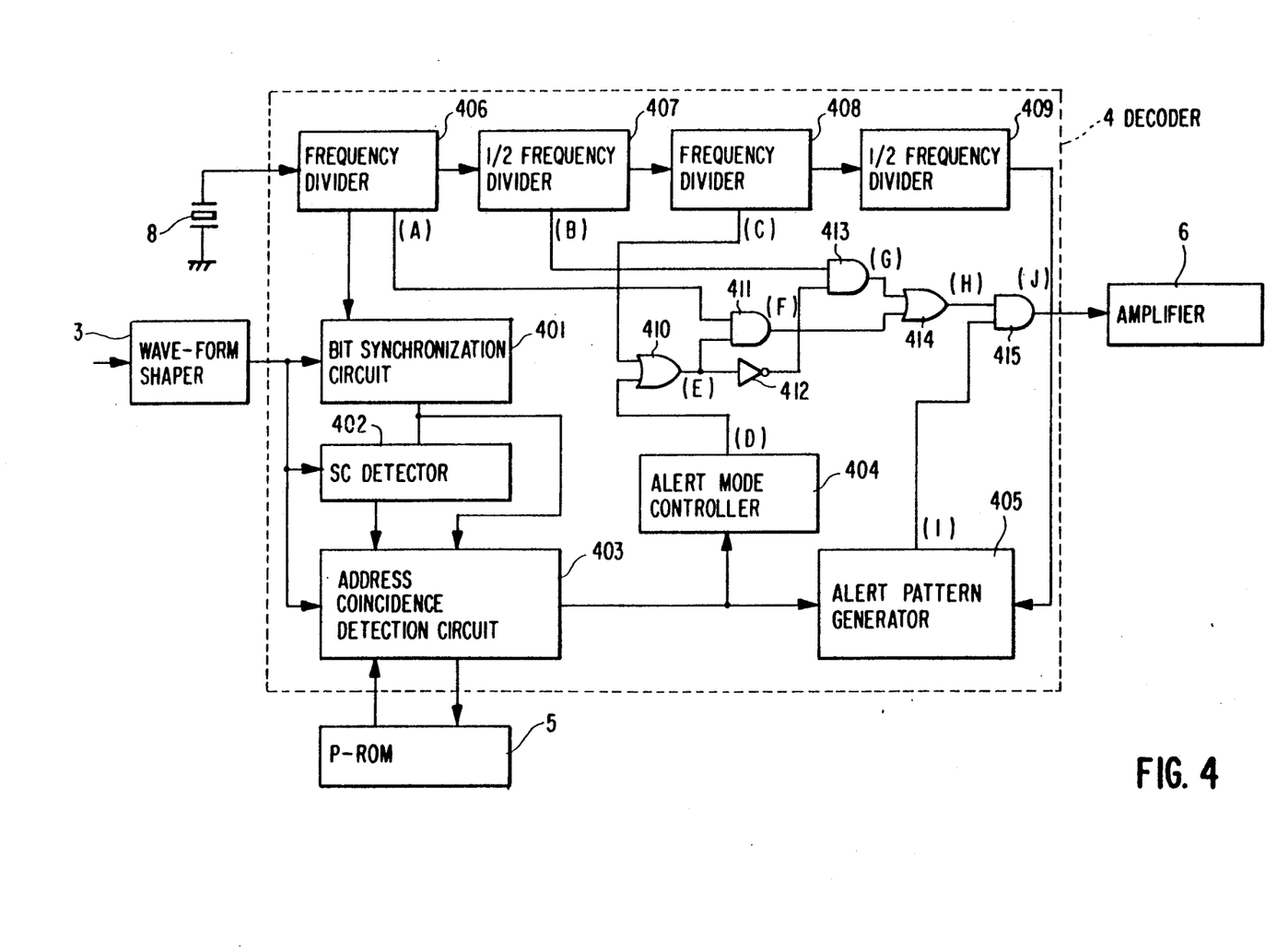
FIG. 4 is a block diagram showing a decoder circuit according to an embodiment of the present invention.
Figure 5A:
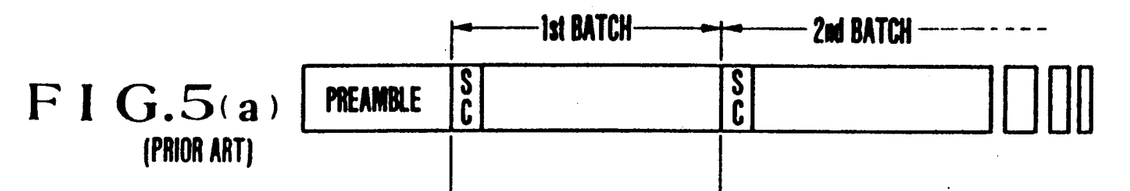
FIGS. 5(a) to 5(c) show formats of input signals to the decoder circuit shown in FIG. 4.
Figure 5B:
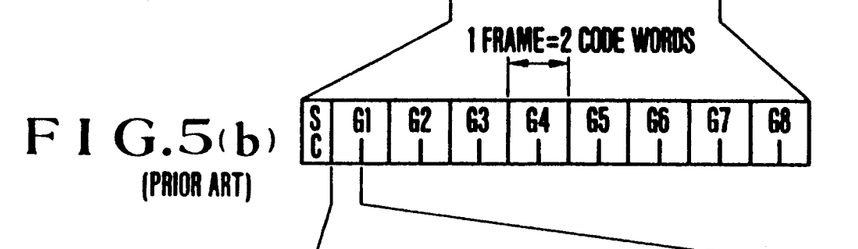

FIG. 4 is a block diagram showing a detailed circuit arrangement of the decoder 4 shown in FIG. 2. Referring to FIG. 4, the output from the waveform shaper 3 corresponds to a signal having an arrangement shown in FIGS. 5(a), 5(b) and 5(c), and is input to a bit synchronization circuit 401, an SC detector 402, and an address coincidence detection circuit 403. The bit synchronization circuit 401 performs bit synchronization between the input signal and a data read-in clock from a frequency divider 406. The SC detector 402 detects a frame synchronization signal (SC) following a preamble signal to perform frame synchronization. The address coincidence detection circuit 403 compares a plurality of addresses in the P-ROM 5 and a received address shown in FIG. 5(c). When a coincidence therebetween is detected, the received address is input to an alert pattern generator 405 and an alert mode controller 404. If the received address is set in a two-frequency alert mode, the alert mode controller 404 sets an output signal (D) at Low level. The alert pattern generator 405 outputs a signal (I) having an ON/OFF pattern corresponding to the received address. Reference numerals 406 to 409 denote frequency dividers for successively frequency-dividing a clock signal from the clock oscillator 8. An OR gate 410 outputs an OR signal (E) of the output (D) from the alert mode controller 404 and an output (C) from the frequency divider 408. An AND gate 411 outputs an AND signal (F) of an output (E) from the OR gate 410 and an output (A) from the frequency divider 406. An AND gate 413 outputs an AND signal (G) of an output (B) from the frequency divider 407 and a signal obtained by inverting the output (E) from the OR gate 410 by an invertor 412. An OR gate 414 provides an OR signal (H) of outputs (F) and (G) from the AND gates 411 and 413. An AND gate 415 provides an AND signal (J) of an output (H) from the OR gate 414 and an output (I) from the alert pattern generator 405, and outputs the AND signal to the amplifier 6.

Figure 6A:
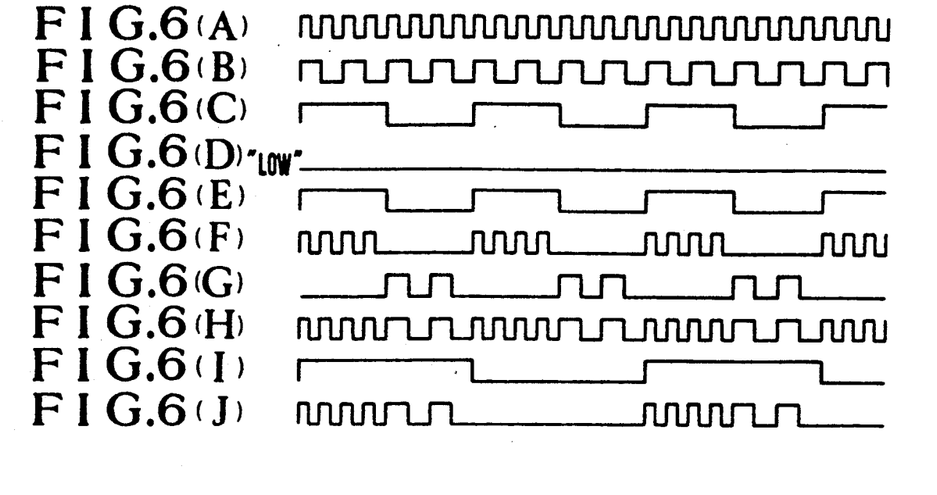

FIG. 6 shows signal waveforms of the respective sections when the output (D) from the alert mode controller 404 is set at "Low" level. The frequency-divider 406 frequency-divides the clock signal from the clock oscillator 8 to output a signal shown in FIG. 6(A) which has a frequency of 2 kHZ and a good acoustic effect and is used as one of tones constituting the alert signals. The frequency-divider 407 ½ frequency-divides the signal (A) output from the frequency-divider 406 to output a signal shown in FIG. 6(B) which has a frequency of 1 kHZ and is also used as another one of the tones constituting the alert signals. The frequency-divider 408 frequency-divides the signal (B) output from the frequency divider 407 to output a signal (C) shown in FIG. 6(C) to the frequency-divider 409 and the OR gate 410. The signal (C) is used by the OR gate 410 as a timing signal for changing the tones within the alert signal. The frequency-divider 409 ½ divides the signal (C) output from the frequency-divider 408 to output a signal which defines the ON/OFF period of the alert signal to the alert pattern generator 405.

The output signal of the wave-form shaper 3 is subjected to the bit synchronization in the bit synchronization circuit 401. When the frame synchronization signal SC is detected, the address coincidence detection circuit 403 starts to compare the received address with the address stored in the P-ROM 5.

Upon detection of an address of the pager, the address coincidence detection circuit 403 sends address information, i.e., a kind of address, for example, first address of the pager, and the function bits, to the alert pattern generator 405 and the alert mode controller 404. The alert pattern generator 405 outputs the signal (I), shown in FIG. 6(I), representing the alert signal pattern to the AND gate 415.

In the alert mode controller 404, information representing an address corresponding to the two-tone alert signal is preset.

The alert mode controller 404 compares the address information supplied from the address coincidence detection circuit 403 with the address information preset therein. When the two address informations coincide with each other, that is, when the address detected by the address coincidence detection circuit 403 corresponds to the two-tone alert signal, the alert mode controller 404 outputs the signal (D) shown in FIG. 6(D).

Figure 7D:
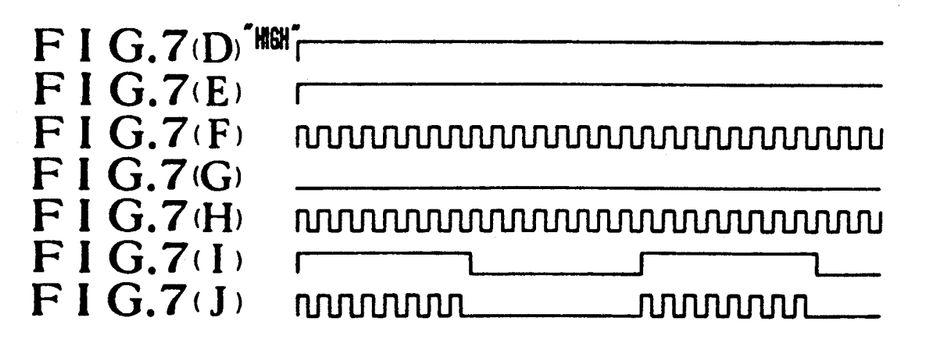

In this case, since the signal (D) is at its low level, the output signal (E) of the OR gate 410 is the same as the output signal (C) of the frequency-divider 408. Accordingly, the AND gate 411 outputs the signal (F) shown in FIG. 6(F), and the AND gate 413 outputs the signal (G) shown in FIG. 6(G). The signals (F) and (G) are ORed by the OR gate 414 to obtain the signal (H) as shown in FIG. 6(H). The signal (H) and the signal (I) from the alert pattern generator 405 are ANDed by the AND gate 415 to obtain the signal (J). As shown in FIG. 6, the output (J) from the AND gate 415 serves as a two-tone alert signal. FIG. 7 shows signal waveforms of the respective sections when the output (D) from the alert mode controller 404 is set at "High" level, that is, the address information output from the address coincidence detection circuit 403 does not coincide with the address information preset in the alert mode controller 404. In this case, the output signal (E) of the OR gate 410 depends on the signal (D) as shown in FIG. 7(E), and, accordingly, the output signal (F) of the AND gate 411 is the same as the signal (A). Since a low-level signal is supplied to one input terminal of the AND gate 413 through the inverter 412, the signal (G) output from the AND gate 413 is at low level as shown in FIG. 7(G), and, therefore, the output signal (H) of the OR gate 414 is the same as the signal (F). The signals (H) and (I) are ANDed by the AND gate 415 to obtain the alert signal (J). As shown in FIG. 7, the output (J) from the AND gate 415 serves as a single tone signal.

Figure 8:
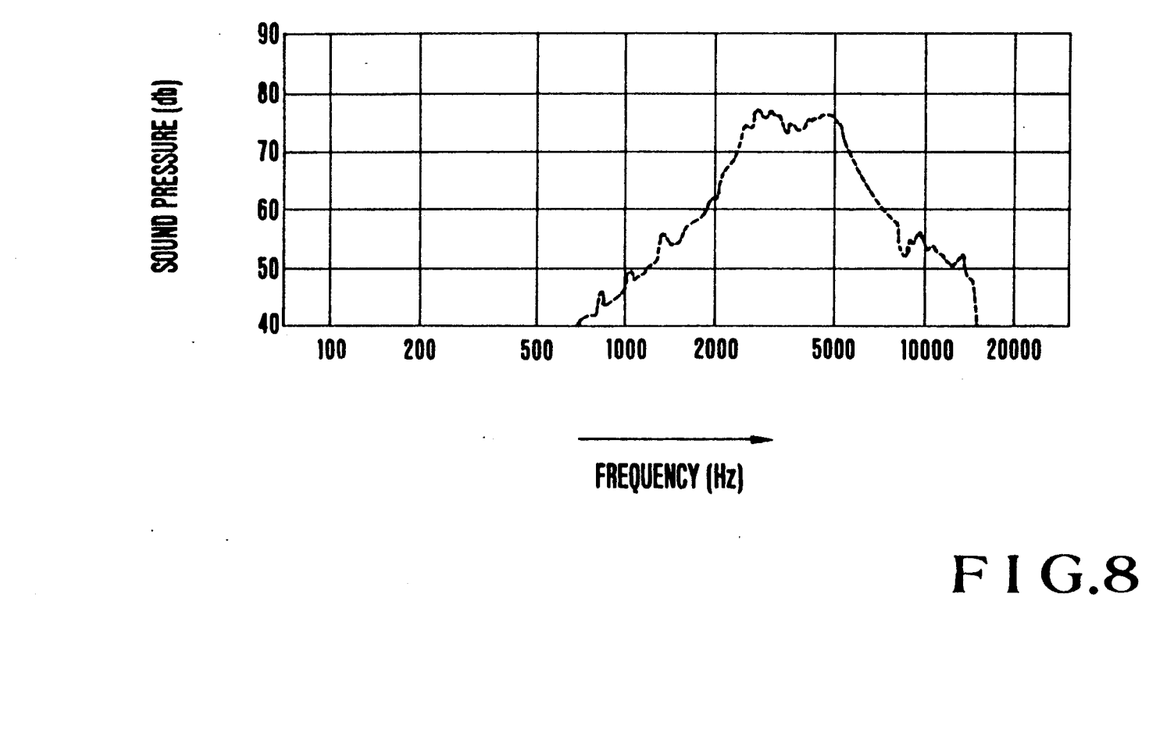
FIG. 8 is a graph showing a measurement result for explaining the effect of the present invention.

FIG. 8 is a graph showing comparison results of sound pressure measurements using the conventional paging receiver and the paging receiver of the present invention. In measurement, the following alert signals were output from paging receivers placed in an anechoic room, and were detected by a microphone so that sound pressure was measured by a sound pressure level meter:

(1) conventional alert signal (ON-OFF at a single frequency of 2.7 kHz)

(2) alert signal having two frequencies including frequency of 2.7 kHz and another frequency of 1.35 kHz (3) ON-OFF at a single frequency of 2 kHz (4) ON-OFF at a single frequency of 1.5 kHz The measurement results are summarized in the Table below. It should be noted that the loudspeaker 7 resonates at the specific frequency of 2.7 kHz.

TABLE 1

| | Sound Pressure (dB) | Relative value when Conventional alert signal is given by 0 dB |
|---|---|---|
| 1-Frequency Mode (2.7 kHz) | 83 | 0 dB |
| 2-Frequency Mode | 81 | −2 |
| 1-Frequency Mode (2.0 kHz) | 74 | −9 |
| 1-Frequency Mode (1.5 kHz) | 74 | −9 |

According to the graph, the sound pressure is 77 dB at 2.7 kHz; 62 dB at 2.0 kHz; and 55 dB at 1.5 kHz.

As can be seen from the graph, in the single frequency mode, when a frequency is noticeably changed, sound pressure is greatly reduced. In contrast to this, the alert signal in the twofrequency mode is free from a decrease in sound pressure.

Figure 5C:
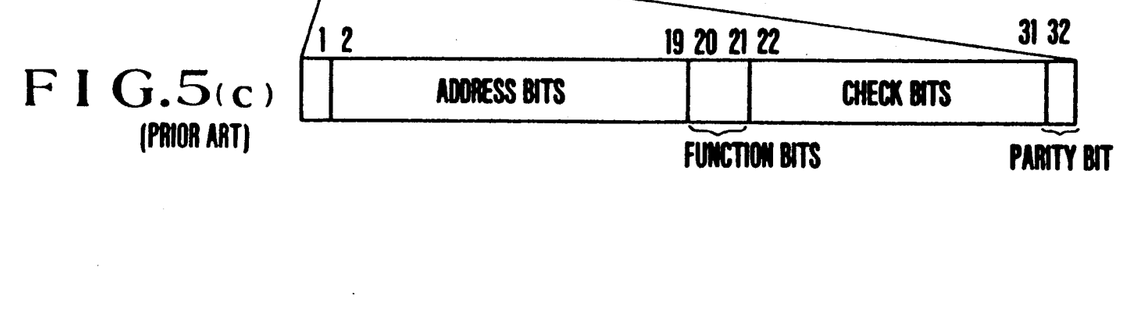
Figure 9:
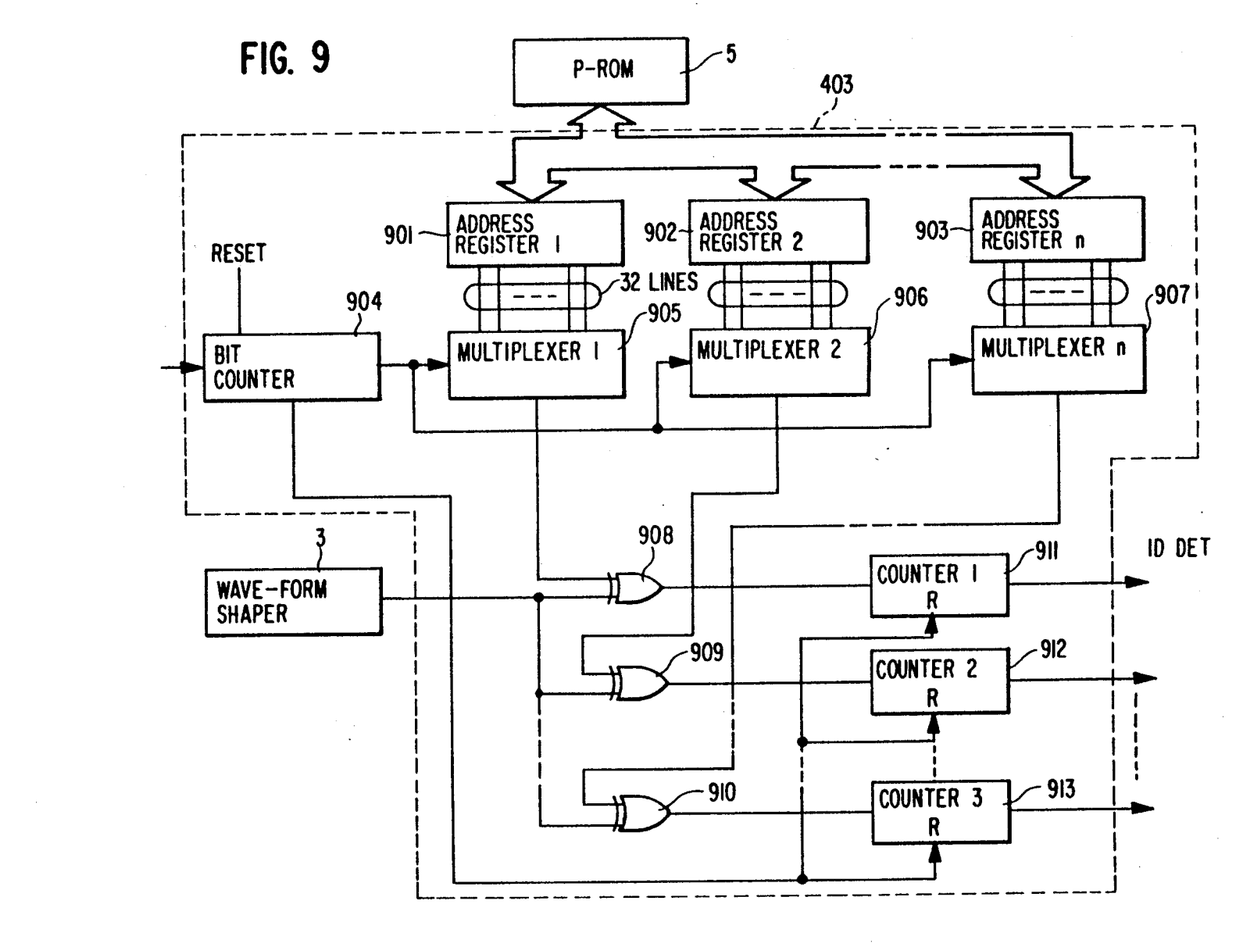
FIG. 9 is a detailed block diagram showing an address coincidence detection circuit for comparing a plurality of addresses in a P-ROM 5 and a received address shown in FIG. 5(c).

FIG. 9 is a detailed block diagram showing the address coincidence detection circuit 403 for comparing a plurality of addresses in the P-ROM 5 and a received address shown in FIG. 5(c). A plurality of call signals stored in P-ROM 5 are registered into a first address register 901, a second address register 902 . . . an n-th address register 903. Bit counter 904 is reset by an output of frame synchronization detector 402 and first through n-th supply multiplexers 905 to 907, as clocks, with the clocks outputted from bit synchronization circuit 401 based on the output of the frame synchronization detector 402. At the same time, when the bit counter 904 establishes a 32 bit count, the bit counter 904 sends an output to a first counter 911, a second counter 912 ... an n-th counter 913 to reset them. The first through n-th multiplexers 905, 906, ... 907 also serve to send the contents of the first through n-th address registers 901, 902, ... 903 each one bit to corresponding XOR circuits 908, 909 ... 910 respectively. Each of the XOR circuits compares received address information sent out from the waveform shaper 3 with the output data outputted from the corresponding multiplexer one bit by one bit. Then coincidence outputs obtained from XOR circuits are counted by the corresponding counters 911, 912, ... 913. If error is within 2 bits, it is judged that address coincidence is obtained. Then an address coincidence detection (ID DET) output is sent to alert mode controller 404 and alert pattern generator 405.

Figure 10:
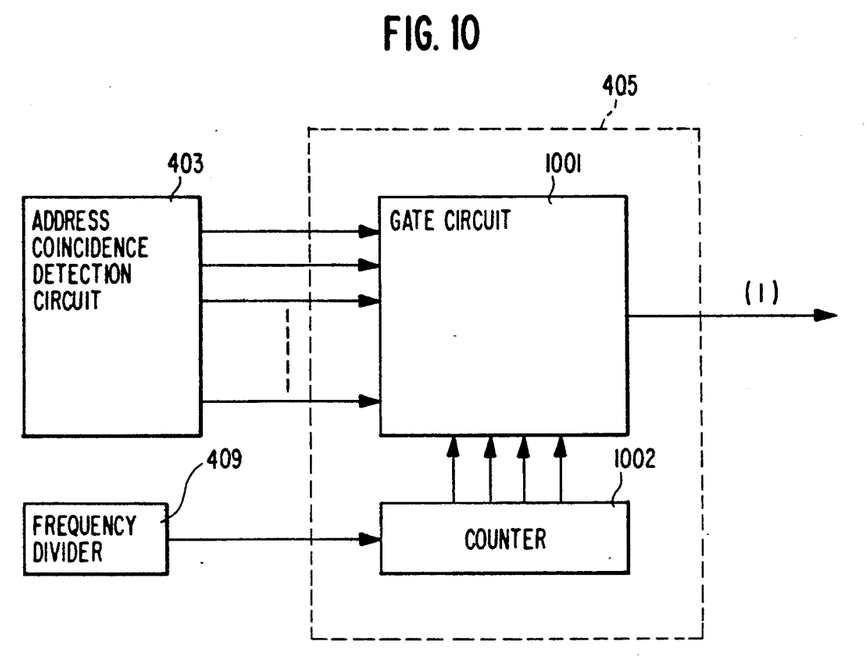
FIG. 10 is a detailed block diagram showing an alert pattern generator 405 for outputting a signal (I) having an ON/OFF pattern corresponding to a received address.

FIG. 10 shows a detailed block diagram of the alert pattern generator 405. Outputted clocks of the frequency divider 409 are inputted to counter 1002. The output of the counter is sent to gate circuit 1001. The gate circuit 1001 receives coincidence detection outputs corresponding to respective coincidence addresses of the address coincidence detection circuit 403 and sends out an output relating to predetermined alert patterns which correspond to the coincidence detection outputs.

Figure 11:
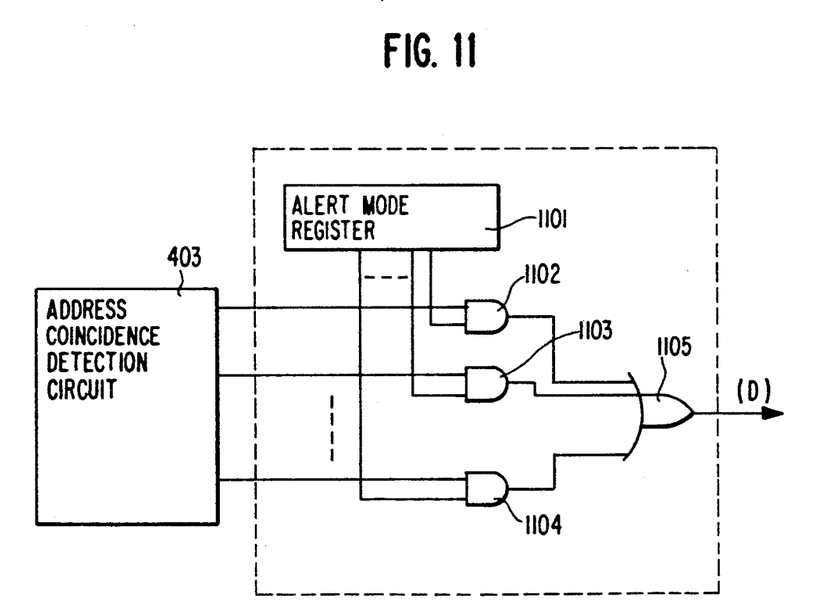
FIG. 11 is a detailed block diagram showing an alert mode controller 404 for setting an output signal (D) according to a received address.

FIG. 11 shows a detailed block diagram of the alert mode controller 404. Alert modes corresponding to respective addresses are set in the alert mode register 1101. The outputs of the alert mode register 1101 and the address coincidence detection circuit 403 are gated by AND gates 1102, 1103, ... 1104. Outputs of these AND gates 1102, 1103, ... 1104 are inputted to NOR circuit 1105. When an address setting 2 frequency mode is detected, a "LOW" signal is sent out from the NOR circuit 1105.

According to the present invention as described above, as compared to the conventional paging receiver wherein ON-OFF durations are formed by turning on and off an alert signal of a single frequency, ON durations are constituted by combinations of alert signals of at least two frequencies including the specific single frequency. The number of types of alert signals which can be relatively easily distinguished can be increased to twice that of the conventional paging receiver. Since the alert signals of the present invention are constituted to include the conventional single frequency, they will not be influenced by acoustic characteristics of a loudspeaker, and sound pressure is not degraded.

What is claimed is:

1. A multi-alert paging receiver having a plurality of addresses thereof comprising: first means for generating first and second signals respectively having first and second frequencies which are different from each other;
second means for detecting from a paging signal said plurality of addresses to produce a plurality of address detect signals corresponding to said plurality of said addresses, respectively;
third means coupled to the output of said second means for generating a plurality of ON/OFF signals having ON/OFF durations, the patterns of said ON/OFF durations corresponding to said plurality of address detect signals, respectively;
fourth means responsive to said address detect signals and to said ON/OFF signals for selectively passing therethrough said first and second signals during the ON durations of said ON/OFF signals to produce the passes signals as alert signals, at least of one of said alert signals including both said first and second signals; and
fifth means for transducing said alert signals into corresponding audible signals.

2. A receiver according to claim 1, wherein said first means comprises:
a plurality of series-connected frequency dividers for successively frequency-dividing an input clock signal to output frequency-divided signals, respectively, which include said first and second signals
and wherein said fourth means comprises; an alert mode controller, connected to said output of said second means, for outputting a signal representing a combination of frequencies to constitute one of said alert signals; and
a logic circuit connected to said plurality of frequency dividers and to outputs of said alert mode controller and said third means, for providing said alert signals based on said signal output from said third means, said signal output from said alert mode controller, and said frequency-divided signals output from said plurality of frequency dividers.

3. A receiver according to claim 1, wherein said first and second frequencies include a specific frequency at which said fifth means resonates.

4. A receiver according to claim 2, wherein said second means comprises an address coincidence detection circuit for comparing a received address with a plurality of address stored in a memory device.

5. A receiver according to claim 4, wherein said address coincidence detection circuit further comprises: a plurality of address registers for storing said plurality of addresses from said memory device; a plurality of multiplexers for sending bit by bit address information from said address registers to a comparing means; a plurality of XOR circuits for comparing address information from said address registers with received address information and outputting coincidence outputs; a plurality of counters for counting said coincidence outputs obtained form said XOR circuits and sending address coincidence detection output when error is within a predetermined number of bits; a bit counter for keeping a bit count and resetting said plurality of counters when said bit count reaches said predetermined number.

6. A receiver according to claim 2, wherein said third means further comprises: a counter for counting a clock signal from a frequency divider and outputting count information; a gate circuit for receiving said output count information from said counter and address coincidence detection outputs from an address coincidence detection circuit, said gate circuit outputting an output relating to predetermined alert patterns which correspond to said address coincidence detection outputs.

7. A receiver according to claim 2, wherein said alert mode controller further comprises: an alert mode register for setting and outputting a plurality of alert modes corresponding to respective addresses; a plurality of AND gates for ANDing said plurality of alert mode outputs and a plurality of respective address coincidence detection outputs from an address coincidence detection circuit, said AND gates outputting alert mode detection signals; a NOR circuit for detecting said alert mode detection signals output from said AND gates and outputting a "LOW" signal when at least one of said alert mode detection signals is detected.

8. A pager for generating an audio-alert signal, comprising:
- receiver means for receiving a paging signal to produce a received signal;
- memory means for storing an address;
- detecting means coupled to said receiver means and said memory means for comparing an address contained in said received signal with the stored address, and for producing a detection signal when the stored address and the address contained in said received signal coincide with each other;
- audible alert means having a resonant frequency; and
- signal generating means responsive to said detection signal for generating first and second alert signals, said first alert signal corresponding to said resonant frequency of said audio means, said second alert signal being different from said resonant frequency of said audio alert means,
- said signal generating means including,
  - means for generating a first signal,
  - means for generating a second signal which is a fraction of a frequency of the first signal,
  - means for generating an alert pattern signal, and
  - means responsive to said first and second signals and to said alert pattern signal for producing said first and second alert signals,
- said audible alert means generating an audio-alert signal in order to signal a user of the pager that the user is being paged, said audio-alert signal including a first audio-alert signal having a frequency corresponding to said resonant frequency of said audio means, and a second audio-alert signal having a frequency which is lower than said resonant frequency.

* * * * *

UNITED STATES PATENT AND TRADEMARK OFFICE
CERTIFICATE OF CORRECTION

PATENT NO. : 5,287,099
DATED : February 15, 1994
INVENTOR(S) : Kazuyuki Tsunoda

It is certified that error appears in the above-identified patent and that said Letters Patent is hereby corrected as shown below:

Col. 6, line 3, delete "passes" and insert --passed--.

Signed and Sealed this

Second Day of August, 1994

Attest:

BRUCE LEHMAN

Attesting Officer

Commissioner of Patents and Trademarks